United States Patent
Seruntine et al.

(10) Patent No.: US 10,046,515 B1
(45) Date of Patent: Aug. 14, 2018

(54) METHOD OF FORMING WIND TURBINE ROTOR BLADE ROOT PORTIONS

(71) Applicant: General Electric Company, Schenectady, NY (US)

(72) Inventors: Nicholas Michael Seruntine, Slidell, LA (US); Matthew Carmichael, New Orleans, LA (US); Michael Blanc, Slidell, LA (US); Harald Behmer, Newport (GB); Peter Broome, Chicago, IL (US); Paul Hayden, Winchester (GB)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 26 days.

(21) Appl. No.: 15/474,252

(22) Filed: Mar. 30, 2017

(51) Int. Cl.
| | | |
|---|---|---|
| B29C 65/00 | (2006.01) | |
| B29C 65/78 | (2006.01) | |
| F03D 1/06 | (2006.01) | |
| B29C 65/48 | (2006.01) | |
| B29L 31/08 | (2006.01) | |

(Continued)

(52) U.S. Cl.
CPC ........ B29C 65/7814 (2013.01); B29C 65/483 (2013.01); B29C 66/7212 (2013.01); F03D 1/0675 (2013.01); B29K 2105/06 (2013.01); B29K 2105/253 (2013.01); B29K 2307/04 (2013.01); B29L 2031/085 (2013.01); F05B 2230/23 (2013.01); F05B 2230/60 (2013.01); F05B 2280/6003 (2013.01)

(58) Field of Classification Search
CPC ............ B29C 65/7814; B29C 65/7844; B29C 65/565; B29C 65/7808; B29C 70/541; B29C 70/70; B29C 66/5221; B29C 66/5241; B29C 66/5261; B29D 99/0025; B29K 2105/06; B29L 2031/085; B32B 37/142; B32B 2603/00; B32B 2605/18; F03D 1/0675; F05B 2230/60; F05B 2230/604
USPC ................... 156/293, 294; 29/889.7, 889.71
See application file for complete search history.

(56) References Cited

U.S. PATENT DOCUMENTS

| | | |
|---|---|---|
| 7,530,168 B2 | 5/2009 | Sorensen et al. |
| 9,180,630 B2 | 11/2015 | Madsen et al. |

(Continued)

FOREIGN PATENT DOCUMENTS

| | | |
|---|---|---|
| CN | 103061995 A | 4/2013 |
| GB | 2524489 B | 2/2016 |
| WO | WO2010149806 A1 | 12/2010 |

*Primary Examiner* — John L Goff, II
(74) *Attorney, Agent, or Firm* — Dority & Manning, P.A.

(57) ABSTRACT

The present disclosure is directed to a method of forming a root portion of a wind turbine rotor blade. A plurality of alignment pins coupled to an alignment plate is aligned with a first set of a plurality of insert cavities defined by a prefabricated panel. Each alignment pin is positioned within one of a first set of a plurality of installation apertures defined by the alignment plate. The prefabricated panel and the alignment plate are coupled such that each alignment pin is positioned within one of the first set of the plurality of insert cavities. A first adhesive is placed in each of the second set of the plurality of insert cavities. A first set of inserts are placed into a second set of the plurality of insert cavities. The first set of inserts and the alignment plate are coupled, and the first adhesive is cured.

20 Claims, 12 Drawing Sheets

(51) Int. Cl.
  *B29K 105/00* (2006.01)
  *B29K 105/06* (2006.01)
  *B29K 307/04* (2006.01)

(56) References Cited

U.S. PATENT DOCUMENTS

2010/0084079 A1* 4/2010 Hayden ................ B29C 70/222
                                              156/189
2013/0330197 A1   12/2013 Feigl
2014/0234109 A1   8/2014 Hayden et al.

* cited by examiner

METHOD OF FORMING WIND TURBINE
ROTOR BLADE ROOT PORTIONS

FIELD

The present disclosure generally relates to wind turbines. More particularly, the present disclosure relates to methods of forming rotor blade root portions for wind turbines.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

Each rotor blade generally couples to a hub connected to the drivetrain. In particular, each rotor blade includes a root portion thereof that couples to the hub via suitable fasteners. The rotor blades are typically formed from a composite material, such as a glass fiber reinforced polymer. In this respect, metallic inserts may be placed into the root portions to receive the fasteners.

The inserts must be located within the root portion in particular positions and within particular tolerances to allow the rotor blade to couple to the hub. Conventional methods of forming the root portions of the rotor blades are time consuming and require complex tooling and highly skilled operators to position the inserts in the root portions within the necessary tolerances. In this respect, conventional methods result in a relatively high cost to produce the root portions of the rotor blades.

Accordingly, improved wind turbines, and, in particular, improved methods for forming the root portions of wind turbine rotor blades, are desired in the art. Specifically, methods that do not require the use of complex tooling and highly skilled operators and that are relatively less expensive to manufacture would be advantageous.

BRIEF DESCRIPTION

Aspects and advantages of the technology will be set forth in part in the following description, or may be obvious from the description, or may be learned through practice of the technology.

In one embodiment, the present disclosure is directed to a method of forming a root portion of a wind turbine rotor blade. The method includes aligning a plurality of alignment pins coupled to an alignment plate with a first set of a plurality of insert cavities defined by a prefabricated panel. The prefabricated panel partially defines the root portion. Each alignment pin is positioned within one of a first set of a plurality of installation apertures defined by the alignment plate. The method also includes coupling the prefabricated panel and the alignment plate such that each alignment pin is positioned within one insert cavity of the first set of the plurality of insert cavities. The method further includes placing a first adhesive in each insert cavity of a second set of the plurality of insert cavities. Additionally, the method includes placing a first set of inserts into the second set of the plurality of insert cavities. Furthermore, the method includes coupling the first set of inserts and the alignment plate and curing the first adhesive.

In another embodiment, the present disclosure is directed to a method of forming a root portion of a wind turbine rotor blade. The method includes removably coupling a plurality of alignment pins to an alignment plate. Each alignment pin is positioned within an installation aperture of a first set of a plurality of installation apertures defined by the alignment plate. The method also includes aligning the plurality of alignment pins with a first set of a plurality of insert cavities defined by a prefabricated panel. The prefabricated panel partially defines the root portion. The method further includes coupling the prefabricated panel and the alignment plate such that each alignment pin is positioned within one insert cavity of the first set of the plurality of insert cavities. Additionally, the method includes placing a first adhesive in each insert cavity of a second set of the plurality of insert cavities. Furthermore, the method includes placing a first set of inserts into a second set of the plurality of insert cavities. The method includes also coupling the first set of inserts and the alignment plate and curing the first adhesive. The method further includes removing the alignment pins from the first set of the plurality of installation apertures and the first set of the plurality of insert cavities.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
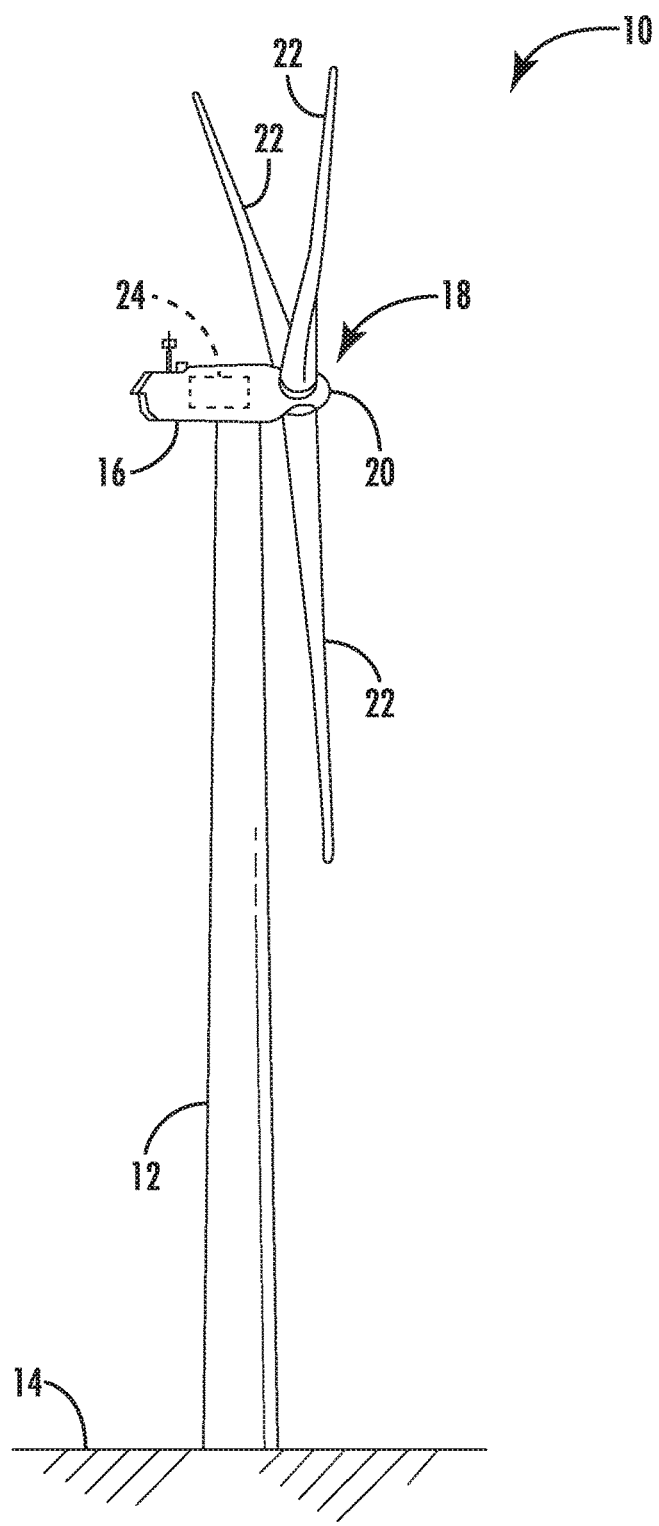
FIG. 1 is a perspective view of an exemplary wind turbine in accordance with embodiments of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable rotational, mechanical energy. A generator 24 positioned in the nacelle 16 may generate electrical power from the rotational energy of the rotor 18.

Figure 2:
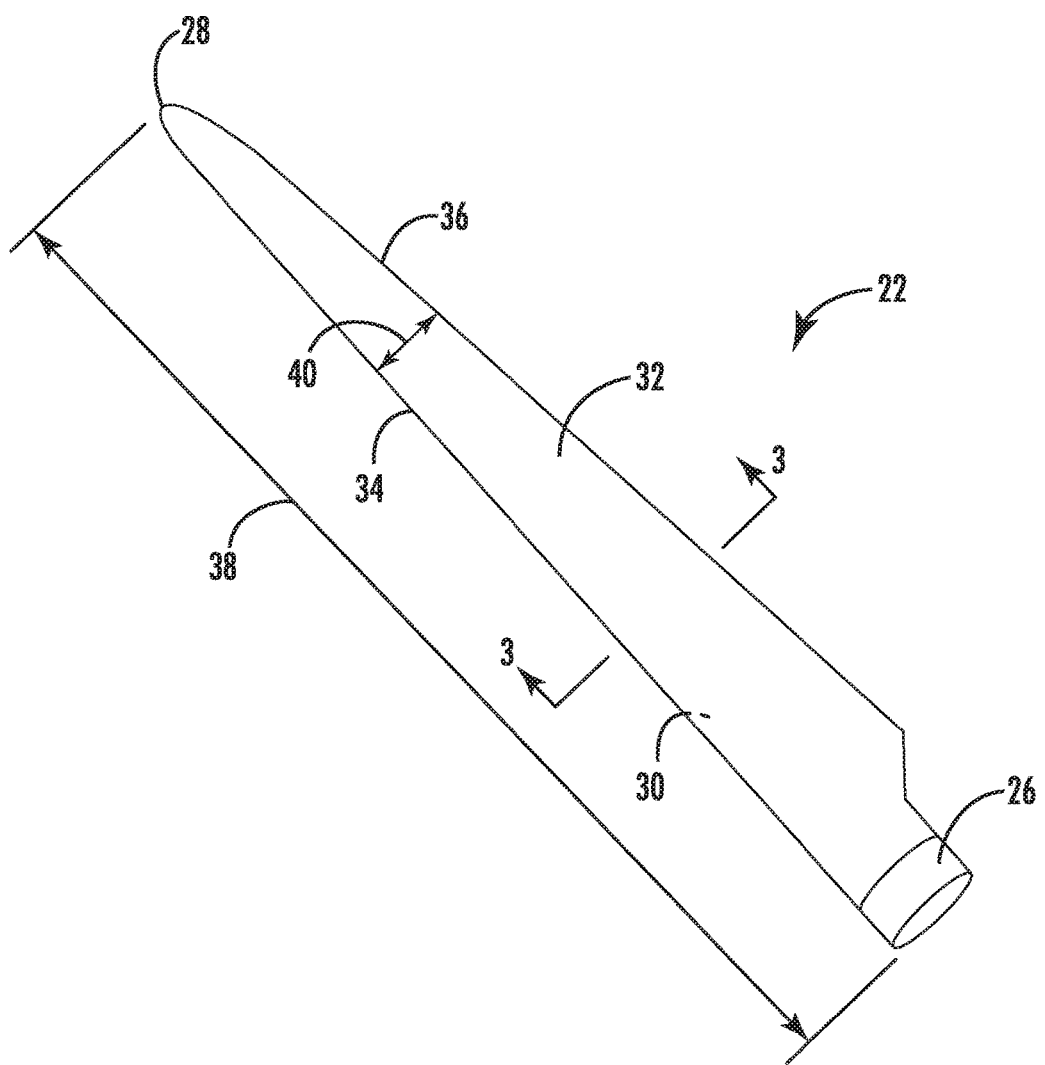
FIG. 2 is a perspective view of an exemplary rotor blade in accordance with embodiments of the present disclosure.

FIG. 2 illustrates a perspective view of one embodiment the rotor blade 22 in accordance with the present disclosure. As shown, the rotor blade 22 includes a blade root 26 that couples to the rotatable hub 20 (FIG. 1) and a blade tip 28 disposed opposite the blade root 26. The rotor blade 22 may also include a pressure side 30 and a suction side 32 extending between a leading edge 34 and a trailing edge 36. Additionally, the rotor blade 22 may include a span 38 defining the total length between the blade root 26 and the blade tip 28 and a chord 40 defining the total length between the leading edge 34 and the trailing edge 36. In general, the chord 40 may vary in length along the span 38 as the rotor blade 22 extends from the blade root 26 to the blade tip 28.

Figure 3:
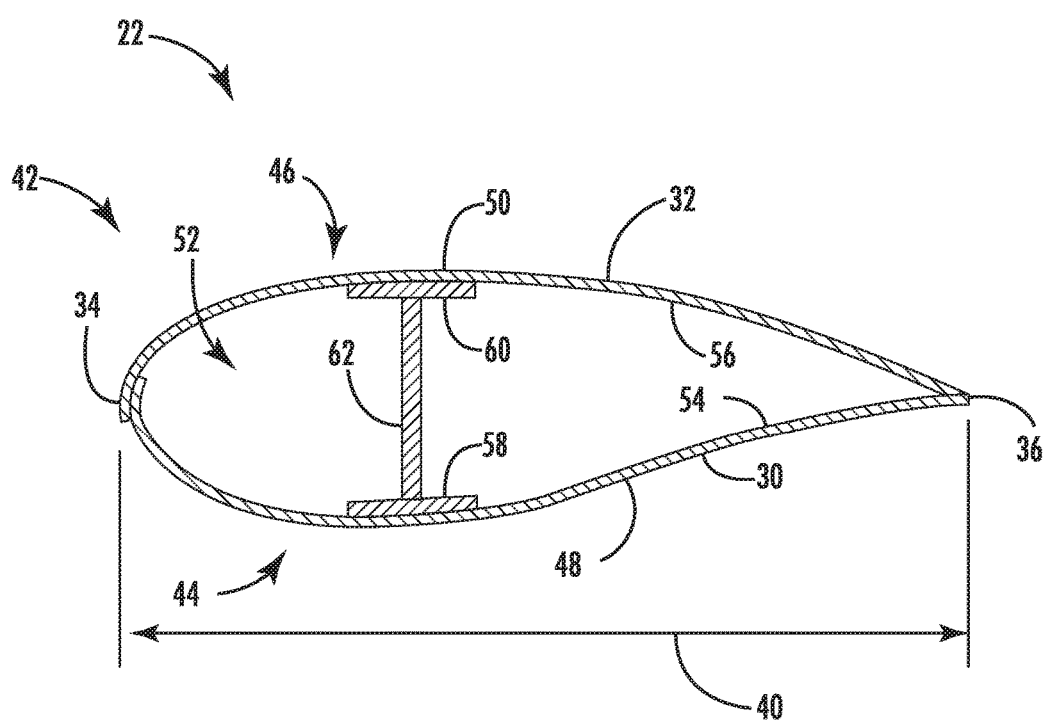
FIG. 3 is a cross-sectional view of the rotor blade taken generally about line 3-3 shown in FIG. 2, illustrating shell portions of the rotor blade in accordance with embodiments of the present disclosure.

Referring now to FIG. 3, the rotor blade 22 may be formed from a shell 42. In some embodiments, the shell 42 includes a first shell portion 44 and a second shell portion 46 coupled (e.g., adhesively coupled) at or proximate to the leading edge 34 and the trailing edge 36 of the rotor blade 22. In this respect, the first and second shell portions 44, 46 may extend along the entire span 38 and/or the entire chord 40. In alternate embodiments, however, the shell 42 may include more or fewer shell portions and/or the shell portions may be joined at different positions on the rotor blade 22. Furthermore, each shell portion 44, 46 may extend for only a portion of the span 38 and/or the chord 40 in some embodiments.

As shown in FIG. 3, the shell 42 includes exterior surfaces defining the various sides and edges of the rotor blade 22. More specifically, the first shell portion 44 includes an exterior surface 48 that defines the pressure side 30 of the rotor blade 22. The second shell portion 46 includes an exterior surface 50 that defines the suction side 32 of the rotor blade 22. In the embodiment shown in FIG. 3, the first and second shell portions 44, 46 couple together such that the second shell portion 46 defines the leading edge 34 and/or the first shell portion 44 defines the trailing edge 36. In alternate embodiments, however, the first shell portion 44 may define the leading edge 34, and the second shell portion 46 may define the trailing edge 36. In further embodiments, the first and second shell portions 44, 46 may both define the leading edge 34 and the trailing edge 36.

The shell 42 defines an interior cavity 52 therein. That is, the rotor blade 22 is generally hollow. In the embodiment shown in FIG. 3, the first shell portion 44 defines an interior surface 54 and the second shell portion 46 defines an interior surface 56. In this respect, the interior surfaces 54, 56 of the first and second shell portions 44, 46 circumscribe the interior cavity 52.

Various structural components may be positioned in the interior cavity 52. In the embodiment shown in FIG. 3, the rotor blade 22 includes a pair of spar caps 58, 60 and a shear web 62 positioned in the interior cavity 52. In alternate embodiments, the rotor blade 22 may include more or fewer spar caps and/or shear webs. Furthermore, the rotor blade 22 may include other structural members or no structural members in other embodiments.

Figure 4:
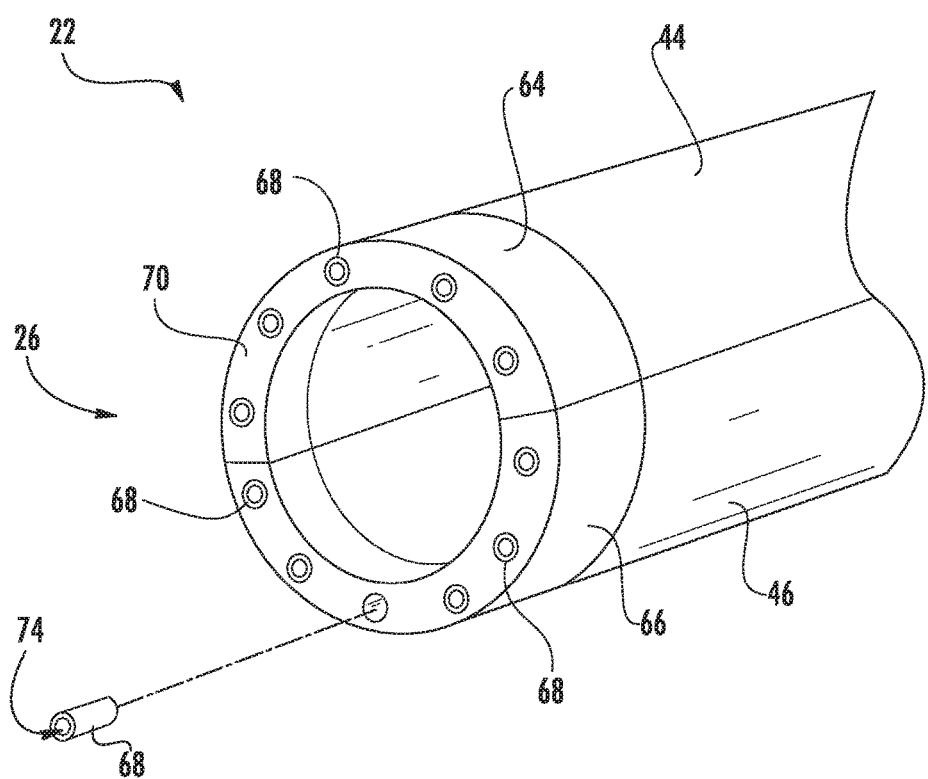
FIG. 4 is a perspective view of a root portion of the rotor blade shown in FIG. 2 in accordance with embodiments of the present disclosure.

FIG. 4 illustrates the root portion 26 of the rotor blade 22 in greater detail. As discussed above, the rotor blade 22 may be formed from the first and the second shell portion 44, 46. In this respect, the first shell portion 44 may define a first section 64 of the root portion 26, and the second shell portion 46 may define a second section 66 of the root portion 26. In alternate embodiments, the root portion 26 may defined by three sections, four sections, or more sections. In further embodiments, the root portion 26 may be a single annular section that couples the first and the second shell portions 44, 46.

The root section 26 includes a plurality of inserts 68 for use in coupling the rotor blade 22 to the hub 20 (FIG. 1). More specifically, the root portion 26 includes a mating surface 70 that mates with the hub 20. In this respect, the inserts 68 extend from the mating surface 70 into the root section 26 in the span-wise direction. As will be discussed in greater detail below, the inserts 68 may be adhesively coupled to the root portion 26. As shown, each insert 68 defines a threaded aperture 74, which may receive a fastener (not shown) that couples the rotor blade 22 to the hub 20. The inserts 68 are preferably metallic.

Figure 5:
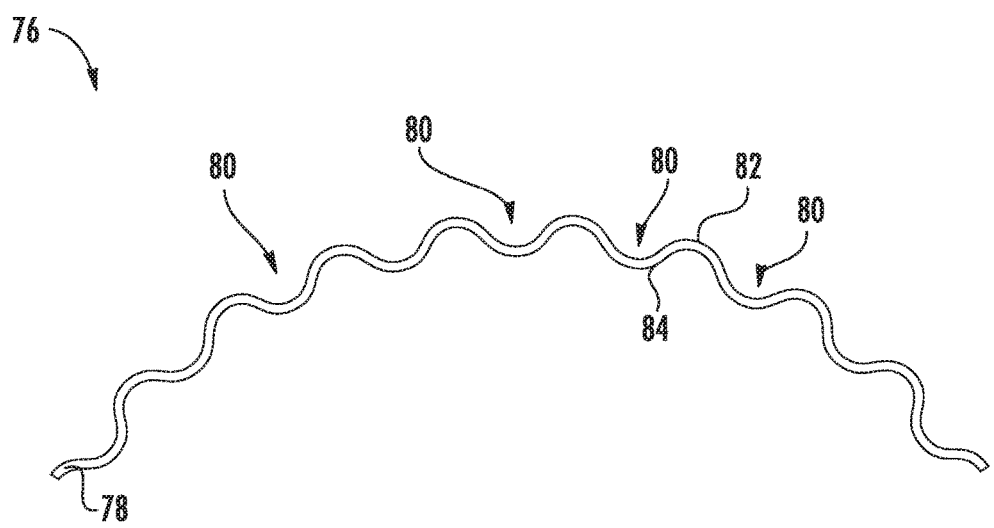
FIG. 5 is a front view of the prefabricated panel in accordance with embodiments of the present disclosure.

Referring now to FIG. 5, one or more prefabricated panels 76 may be used to form at least part of the root section 26. In particular embodiments, the first and the second sections 64, 66 of the root portion 26 may each include one prefabricated panel 76. In alternate embodiments, each of the first and the second sections 64, 66 may include multiple prefabricated panels 76. In this respect, any number of prefabricated panels 76 may be used when forming the root portion 26.

FIG. 5 illustrates one of the prefabricated panels 76. More specifically, the prefabricated panel 76 includes a mating surface 78 that corresponds to all of or a portion of the mating surface 70 of the root portion 26. Furthermore, the prefabricated panel 76 defines a plurality of insert cavities 80 extending from the mating surface 78 in the span-wise direction. The insert cavities 80 may give prefabricated panel 76 a scalloped appearance. The insert cavities 80 are sized to receive the corresponding insert 68 and the necessary adhesive for coupling the insert 68 to the prefabricated panel 76. The prefabricated panel 76 also includes an outer surface 82 and an inner surface 84. The prefabricated panel 76 is arcuate to conform to the shape of a section of the root portion 26, such as the first or the second section 64, 66.

Each prefabricated panel 76 has the desired final dimensions and shape of the corresponding portion of the root portion 26. In this respect, each prefabricated panel 76 is cured or otherwise in a final manufacturing state. That is, all necessary manufacturing operations have been performed to put the prefabricated panels 76 in a finished state. In this respect, the prefabricated panels 76 may be formed from a cured fiber-reinforced resin-based polymer, such as a glass fiber reinforced polymer. In alternate embodiments, the prefabricated panels 76 may be formed from any suitable material.

Figure 6:
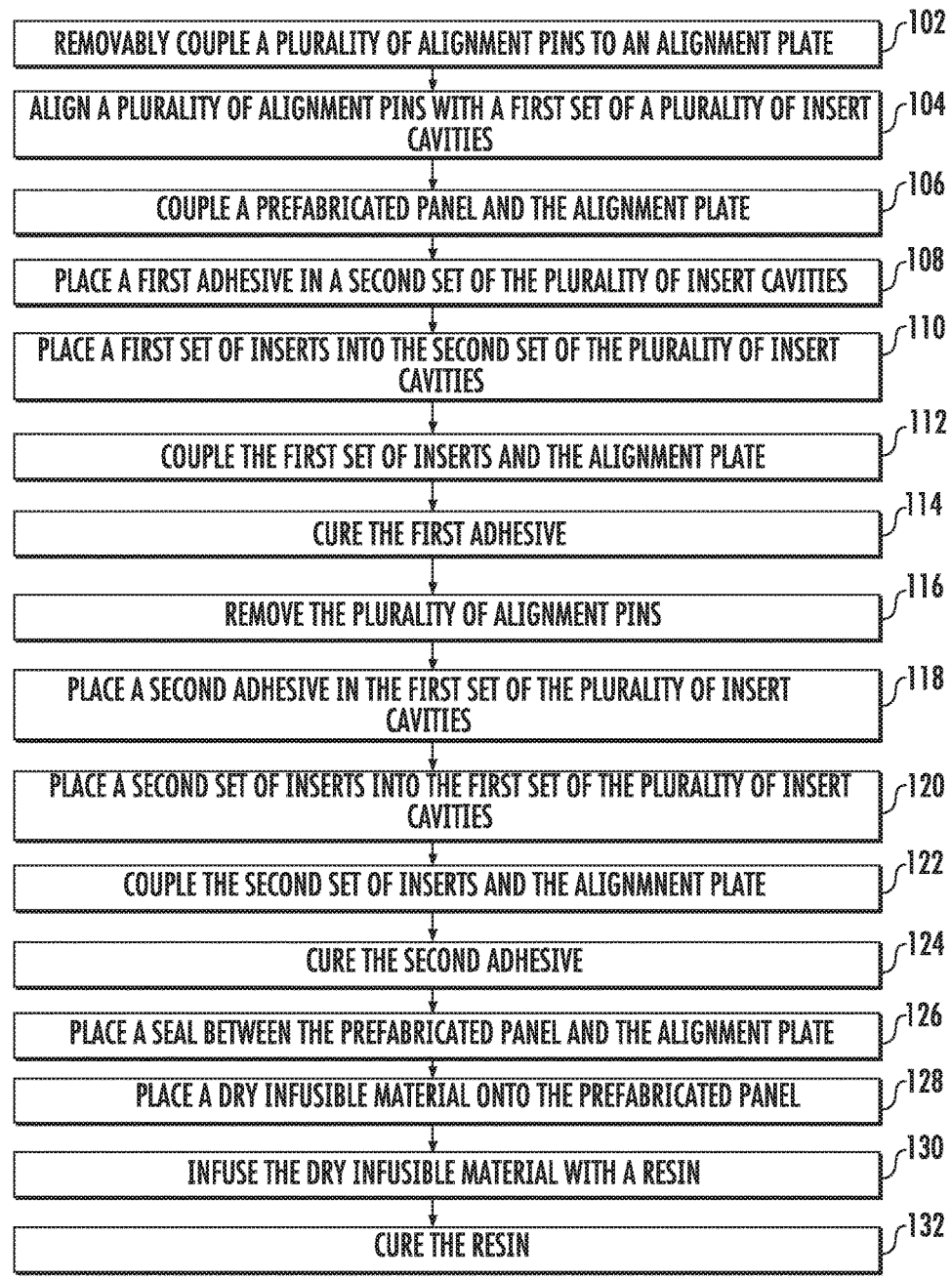
FIG. 6 is a flow chart illustrating an embodiment of a method for forming a root portion of a rotor blade in accordance with embodiments of the present disclosure.

FIG. 6 illustrates one embodiment of a method 100 for forming a root portion of a rotor blade, such as the root portion 26 of the rotor blade 22, in accordance with the present disclosure. FIGS. 7-16 illustrate various aspects and embodiments of the method 100.

Figure 7:
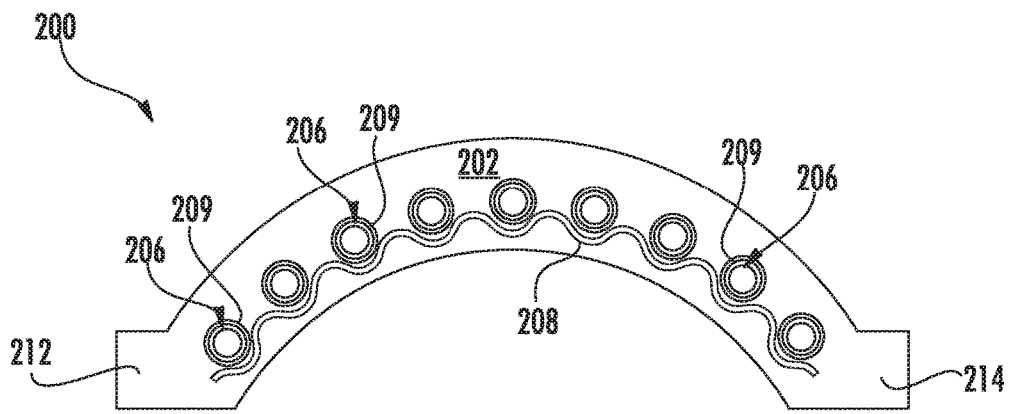
FIG. 7 is a front view of an alignment plate for use in forming the root portion in accordance with embodiments of the present disclosure.
Figure 14:
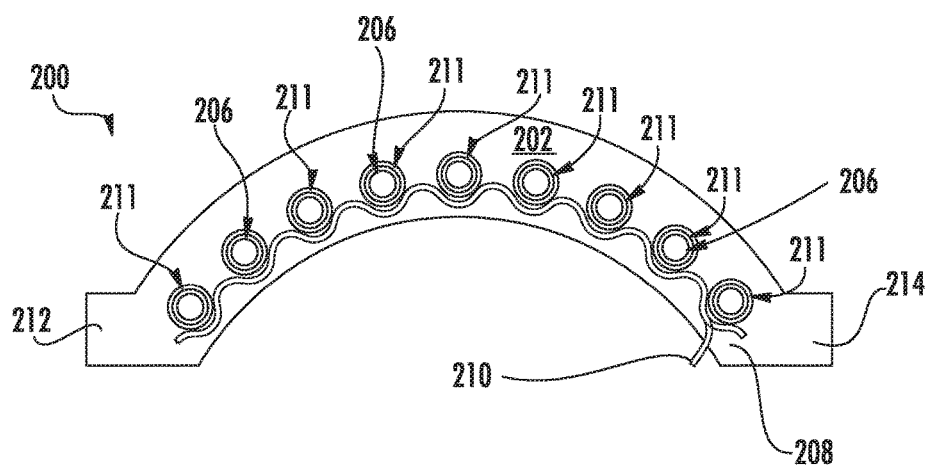
FIG. 14 is a front view of placing a seal on the alignment plate in accordance with embodiments of the present disclosure.
Figure 15:
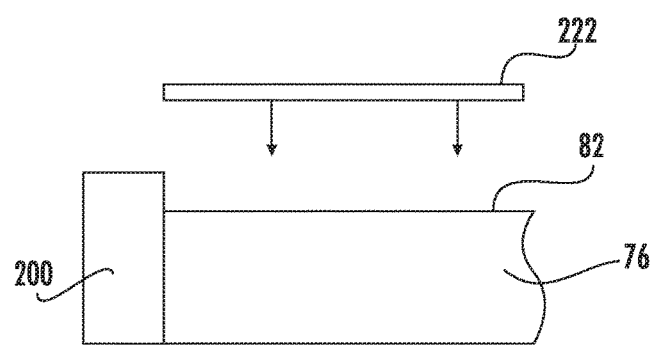
FIG. 15 is a side view of placing a dry, infusible material on the prefabricated panel in accordance with embodiments of the present disclosure.
Figure 16:
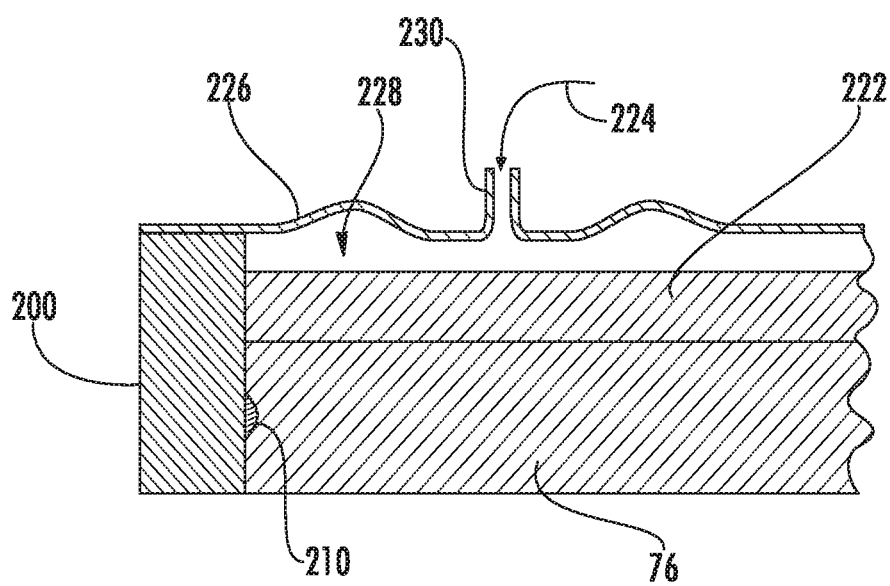
FIG. 16 is a cross-sectional view of infusing the dry, infusible material placed on the prefabricated panel with a resin in accordance with embodiments of the present disclosure.

FIG. 7 illustrates an alignment plate 200 for use in method 100. As shown, the alignment plate 200 is arcuate to conform to the shape of one of the prefabricated panels 76. The alignment plate 200 includes an inner surface 202 and an outer surface 204 (FIG. 10) and defines a plurality of installation apertures 206 extending therethrough. In this respect, the alignment plate 200 may define as many installation apertures 206 as the prefabricated panel 76 defines insert cavities 80 (FIG. 5). Furthermore, the spacing and positioning of the installation apertures 206 is generally corresponds to the desired placement of the inserts 68 within the root portion 26. In alternate embodiments, however, the alignment plate 200 may define more or fewer installation apertures 206 and the installation apertures 206 may be positioned in any suitable manner. The alignment plate 200 may optionally define a corrugated groove 208 extending inward from the inner surface 202 for receiving a corrugated seal 210 (FIG. 14). The alignment plate 200 may optionally define a plurality of annular grooves 209 positioned around the installation apertures 206 for receiving a plurality of annular seals 211 (FIG. 14). The alignment plate 200 may be supported at a desired height and position by a suitable frame (not shown). In this respect, the alignment plate 200 may include a pair of outwardly extending arms 212, 214 that may couple to the frame.

Figure 8:
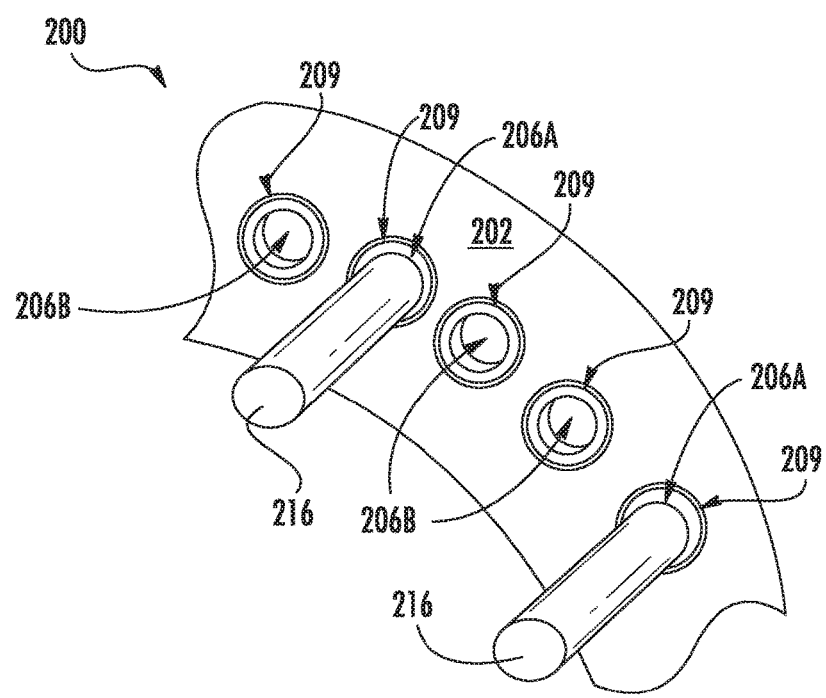
FIG. 8 is a perspective view of a portion of the alignment plate shown in FIG. 6, illustrating a plurality of alignment pins in accordance with embodiments of the present disclosure.

Referring now to FIGS. 6 and 8, the method 100 includes removably coupling a plurality of alignment pins 216 to the alignment plate 200 in step 102. In particular, each alignment pin 216 is removably positioned in one of the installation apertures 206. As shown in FIG. 8, the alignment pins 216 are positioned in only some of the installation apertures 206, such as every other installation aperture 206 or every third installation aperture 206. In alternate embodiments, however, the alignment pins 216 may be positioned in any number of the installation apertures 206 or in any pattern of installation apertures 206 so long as at least one installation aperture 206 does not have one of the alignment pins 216 positioned therein. As such, the alignment pins 216 are positioned in a first set of the installation apertures 206A, while a second set of the installation apertures 206B is free from the alignment pins 216.

Figure 9:
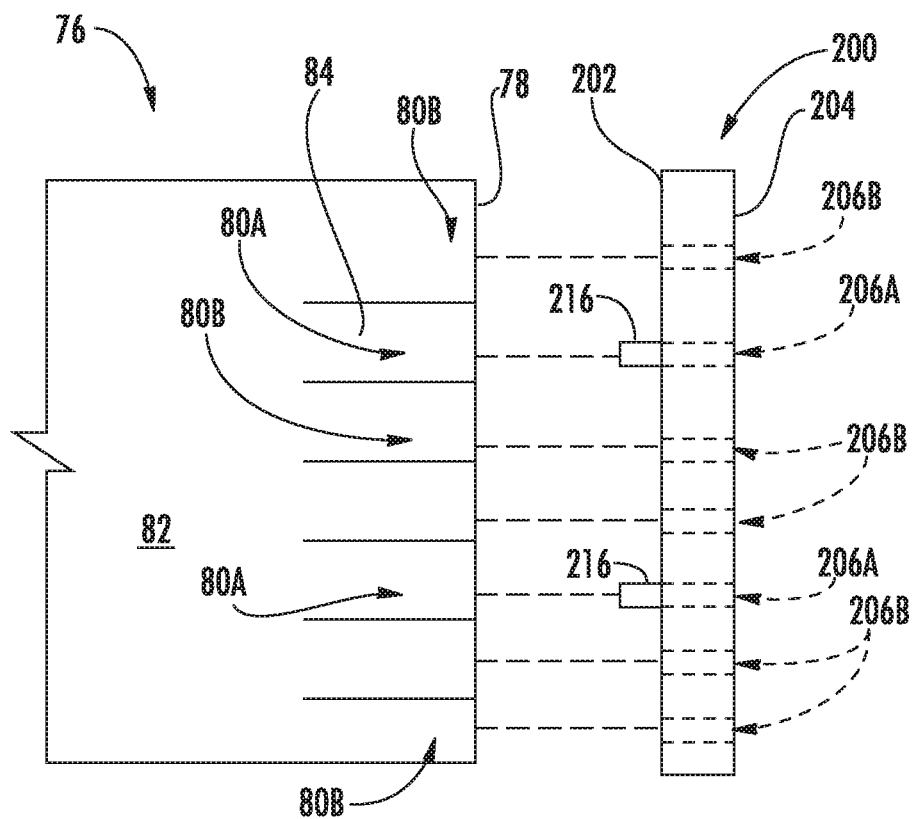
FIG. 9 is a top view of the alignment plate and a prefabricated panel, illustrating the relative alignment therebetween in accordance with embodiments of the present disclosure.

In step 104, the plurality of alignment pins 216 are aligned with a first set of the plurality of insert cavities 80A. In this respect, and as shown in FIG. 9, the prefabricated panel 76 is positioned relative to the alignment plate 200 such that the alignment pins 216 in the installation apertures 206A are aligned with the insert cavities 80A. In this respect, the first set of the insert cavities 80A corresponds to the first set of the installation apertures 206A.

In step 106, the prefabricated panel 76 and the alignment plate 200 are coupled. More specifically, the prefabricated panel 76 and the alignment plate 200 are pulled together such that the mating surface 78 of the prefabricated panel 76 and the inner surface 202 of the alignment plate 200 are in contact. In this respect, the alignment pins 216 coupled to the alignment plate 200 are inserted into the first set of insert cavities 80A in the span-wise direction. The prefabricated panel 76 and the alignment plate 200 may then be coupled using suitable clamps and/or fasteners (not shown).

Figure 10:
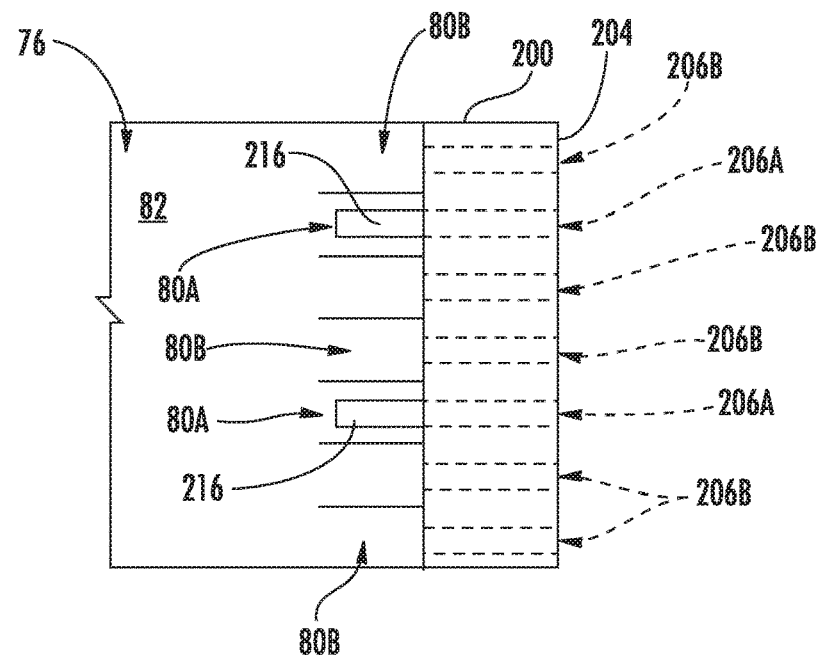
FIG. 10 is a top view of the installation of a first set of inserts into the prefabricated panel in accordance with embodiments of the present disclosure.

FIG. 10 illustrates the prefabricated panel 76 and the alignment plate 200 after completion of step 106. As shown, the alignment pins 216 coupled to the alignment plate 200 are positioned within the first set of insert cavities 80A. In this respect, the positioning of the alignment pins 216 within the insert cavities 80A aligns a second set of insert cavities 80B with the second set of installation apertures 206B. Like the installation apertures 206B, the insert cavities 80B are free from the alignment pins 216.

In step 108, a first adhesive 218 is placed into the second set of the insert cavities 80B. A first set of inserts 68A is placed into the second set of insert cavities 80B, such as in the span-wise direction, in step 110. In this respect, the first set of inserts 68A are placed on the first adhesive 218 in the second set of insert cavities 80B.

Figure 11:
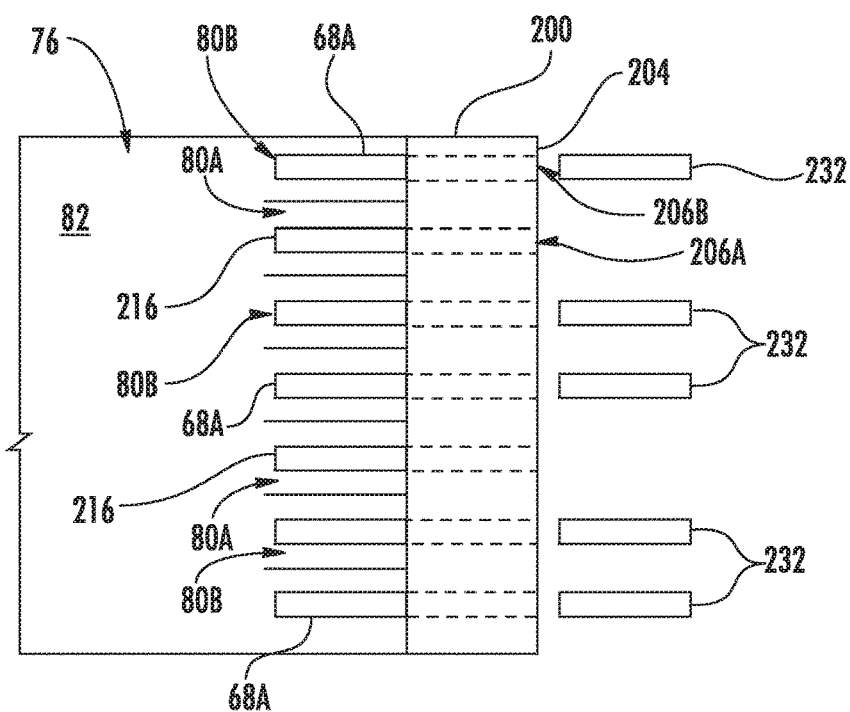
FIG. 11 is a top view of coupling the first set of inserts and alignment plate in accordance with embodiments of the present disclosure.
Figure 12:
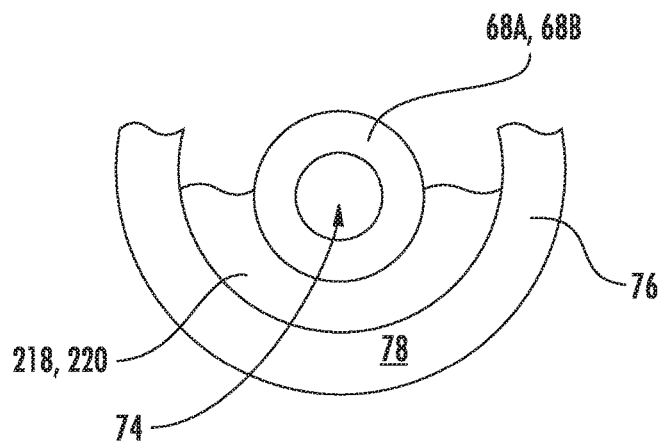
FIG. 12 is a front view of an insert after installation into the prefabricated panel in accordance with embodiments of the present disclosure.

Referring now to FIGS. 6 and 11, the first set of inserts 68A and the alignment plate 200 are coupled in step 112. More specifically, a first set of fasteners 232 may be inserted into the second set of installation apertures 206B to engage (e.g., threadingly engage) the inserts 68A. In this respect, the fasteners 232 align the inserts 68A with the installation apertures 206B. As such, the installation apertures 206B locate the inserts 68A with the insert cavities 80B in the desired position in the prefabricated panel 76 and with the desired dimensional accuracy. The fasteners 232 may be bolts, screws, pins, or any other suitable fastener. In step 114, the first adhesive 218 is cured. FIG. 12 illustrates the positioning of one of the inserts 68A after completion of step 112.

In step 116, the plurality of alignment pins 216 are removed from the alignment plate 200. In particular embodiments, the alignment pins 216 may be removed from the alignment plate 200 through the installation apertures 206A such that the alignment plate 200 and the prefabricated panel 76 need not be decoupled. Upon completion of step 116, the installation apertures 206A and the insert cavities 80A are able to receive the inserts 68.

In step 118, a second adhesive 220 is placed into the first set of the insert cavities 80A. A second set of inserts 68B is placed into the first set of insert cavities 80A, such as in the span-wise direction, in step 120. In this respect, the second set of inserts 68B is placed on the second adhesive 220 in the first set of insert cavities 80A.

Figure 13:
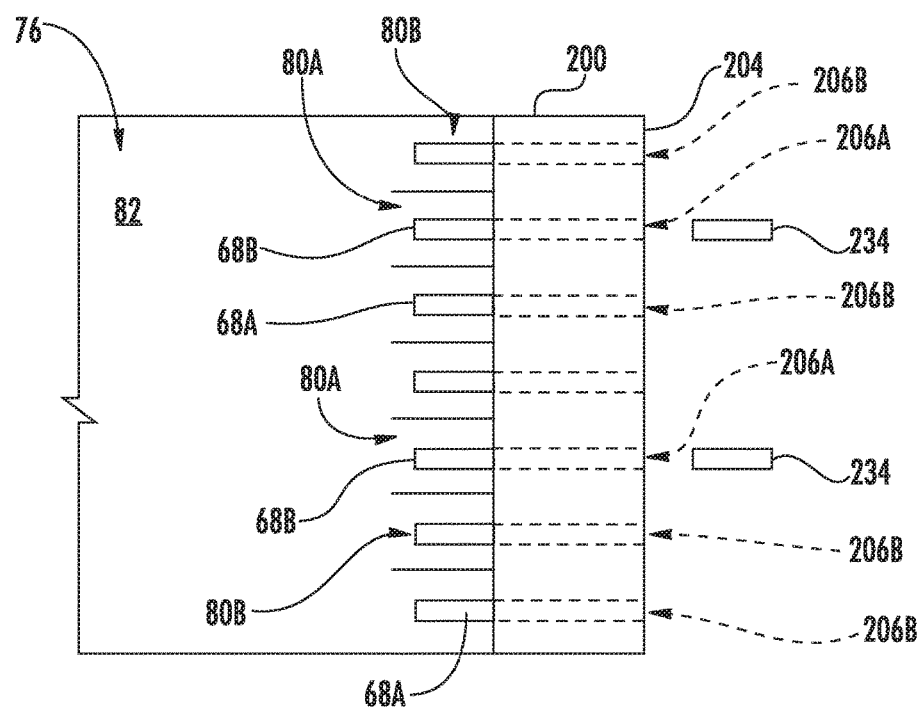
FIG. 13 is a top view of the installation of a second set of inserts into the prefabricated panel in accordance with embodiments of the present disclosure.

Referring now to FIGS. 6 and 13, the second set of inserts 68B and the alignment plate 200 are coupled in step 122. More specifically, a second set of fasteners 234 may be inserted into the installation apertures 206A to engage (e.g., threadingly engage) the inserts 68B. In this respect, the fasteners 234 align the inserts 68B with the installation apertures 206A. As such, the installation apertures 206A locate the inserts 68B with the insert cavities 80A in the desired position in the prefabricated panel 76 and with the desired dimensional accuracy. The fasteners 234 may be bolts, screws, pins, or any other suitable fastener. In step 124, the second adhesive 220 is cured. FIG. 12 illustrates the positioning of one of the inserts 68B after completion of step 124.

After completion of step 124, all of the inserts 68A, 68B are positioned within and coupled to the prefabricated panel 76. As discussed above, the inserts 68A, 68B are located in the desired positions within the insert cavities 80A, 80B and with the desired dimensional accuracy. In this respect, the root portion 26 formed by the prefabricated panel 76 properly aligns with the apertures (not shown) defined by the hub 20 (FIG. 1) when coupling the rotor blade 22 and the hub 20.

In step 126, the corrugated seal 210 and/or the annular seals 211 may be placed between the prefabricated panel 76 and the alignment plate 200. More specifically, the prefabricated panel 76 and the alignment plate 200 may be decoupled. The corrugated seal 210 may be placed in the corrugated groove 208 as illustrated in FIG. 14. Similarly, the annular seals 209 may be placed in the annular grooves 209. The prefabricated panel 76 and the alignment plate 200 are then recoupled.

In step 128, dry, infusible material 222 may be placed onto the prefabricated panel 76. In the embodiment shown in FIG. 15, the dry, infusible material 222, such as a fabric containing glass reinforcing fibers, is placed on the outer surface 82 of the prefabricated panel 76. In this respect, the dry, the infusible material 222 may form a portion of the exterior surfaces 48, 50 of the first or the second shell portions 44, 46. As such, the shell portions 44, 46 may be formed from the inside from of the rotor blade 22 to the outside of rotor blade 22. That is, the interior surfaces 54, 56 are formed prior to the exterior surfaces 48, 50. The dry, infusible material 222 may also be placed on the outer surface 82 of the prefabricated panel 76 to form a portion of the interior surfaces 54, 56 of the first or the second shell portions 44, 46. The prefabricated panel 76 acts as mold onto which the dry, infusible material 222 may be placed. In this respect, a permanent mold or other similar tooling is not needed in method 100. The dry infusible material 222 has not yet been infused with or otherwise exposed to resin.

In step 130, the dry, infusible material 222 is infused with a resin 224. In the embodiment shown in FIG. 16, a vacuum bag 226 is placed over the dry, infusible material 222. The vacuum bag 226 may be attached (e.g., adhesively attached) to the alignment plate 200. In this respect, the vacuum bag 226, the alignment plate 200, the seal 210, and the prefabricated panel 76 collectively define an infusion chamber 228. The resin 224 is pumped into the infusion chamber 228 via a port 230 in the vacuum bag 226 to infuse the dry, infusible material positioned therein. The resin 224 is cured in step 132. Upon completion of step 132, the root section 26 or a portion thereof is formed.

As discussed in greater detail above, the method 100 and the alignment plate 200 position the inserts 68 within the desired position in the prefabricated panel 76 with the desired dimensional accuracy. Furthermore, the prefabricated panel 76 may be used as a mold when forming parts of the root portion 26 in place of permanent tooling. In this respect, the method 100 does not require complex tooling and highly skilled operators unlike conventional methods. As such, the method 100 and the alignment plate 200 reduce the cost of forming the root portion 26 compared to conventional methods.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of forming a root portion of a wind turbine rotor blade, the method comprising:
    aligning a plurality of alignment pins coupled to an alignment plate with a first set of a plurality of insert cavities defined by a prefabricated panel, the prefabricated panel partially defining the root portion, wherein each alignment pin is positioned within one of a first set of a plurality of installation apertures defined by the alignment plate;
    coupling the prefabricated panel and the alignment plate such that each alignment pin is positioned within one insert cavity of the first set of the plurality of insert cavities;
    placing a first adhesive in each insert cavity of a second set of the plurality of insert cavities;
    placing a first set of inserts into the second set of the plurality of insert cavities;
    coupling the first set of inserts and the alignment plate; and
    curing the first adhesive.

2. The method of claim 1, wherein coupling the first set of inserts and the alignment plate comprises inserting a first set of fasteners through a second set of plurality of installation apertures.

3. The method of claim 1, further comprising:
    removing the alignment pins from the first set of the plurality of installation apertures and the first set of the plurality of insert cavities.

4. The method of claim 3, further comprising:
placing a second adhesive in each insert cavity of the first set of the plurality of insert cavities.

5. The method of claim 4, further comprising:
placing a second set of inserts into the first set of the plurality of insert cavities after removing the alignment pins.

6. The method of claim 5, further comprising:
coupling the second set of inserts and the alignment plate; and
curing the second adhesive.

7. The method of claim 1, further comprising:
placing a dry infusible material onto the prefabricated panel.

8. The method of claim 7, wherein the dry infusible material comprises a plurality of glass reinforcing fibers.

9. The method of claim 7, further comprising:
infusing the dry infusible material with a resin.

10. The method of claim 9, further comprising:
curing the resin.

11. The method of claim 1, wherein the prefabricated panel is formed from a cured fiber reinforced resin-based polymer.

12. The method of claim 1, further comprising:
placing a seal between the prefabricated panel and the alignment plate.

13. The method of claim 1, further comprising:
removably coupling each alignment pin to the alignment plate.

14. A method of forming a root portion of a wind turbine rotor blade, the method comprising:
removably coupling a plurality of alignment pins to an alignment plate, each alignment pin being positioned within an installation aperture of a first set of a plurality of installation apertures defined by the alignment plate;
aligning the plurality of alignment pins with a first set of a plurality of insert cavities defined by a prefabricated panel, the prefabricated panel partially defining the root portion;
coupling the prefabricated panel and the alignment plate such that each alignment pin is positioned within one insert cavity of the first set of the plurality of insert cavities;
placing a first adhesive in each insert cavity of a second set of the plurality of insert cavities;
placing a first set of inserts into the second set of the plurality of insert cavities;
coupling the first set of inserts and the alignment plate;
curing the first adhesive; and
removing the alignment pins from the first set of the plurality of installation apertures and the first set of the plurality of insert cavities.

15. The method of claim 14, wherein coupling the first set of inserts and the alignment plate comprises inserting a first set of fasteners through a second set of plurality of installation apertures.

16. The method of claim 14, further comprising:
placing a second adhesive in each insert cavity of the first set of the plurality of insert cavities.

17. The method of claim 16, further comprising:
placing a second set of inserts into the first set of the plurality of insert cavities after removing the alignment pins;
coupling the second set of inserts and the alignment plate; and
curing the second adhesive.

18. The method of claim 14, further comprising:
placing a dry infusible material onto the prefabricated panel.

19. The method of claim 18, further comprising:
infusing the dry infusible material with a resin; and
curing the resin.

20. The method of claim 19, further comprising:
placing a seal between the prefabricated panel and the alignment plate.

* * * * *